8624X
H. Pepper,
Saw Teeth.
Patented Feb. 5, 1835.
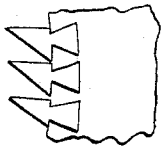
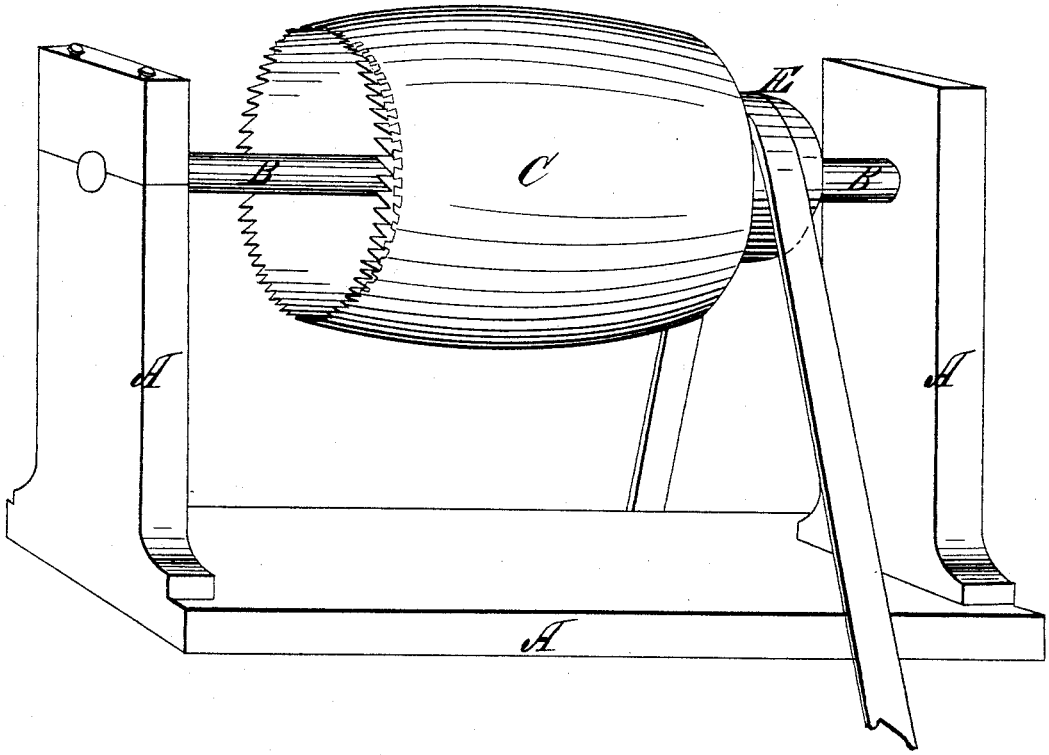
AM. PHOTO-LITHO. CO. N.Y. (OSBORNE'S PROCESS)

UNITED STATES PATENT OFFICE.

8624X

HART PEPPER, OF SOUTHWICK, MASSACHUSETTS.

IMPROVEMENT IN THE MODE OF SAWING STAVES.

Specification forming part of Letters Patent dated February 5, 1835.

*To all whom it may concern:*

Be it known that I, HART PEPPER, of Southwick, in the county of Hampden and Commonwealth of Massachusetts, have invented a new and useful Improvement in the Mode of Sawing Staves of All Kinds and of All other Kinds of Cylindrical Work; and I do hereby declare that the following is a full and exact description of the construction and operation of the said machine as invented or improved by me.

In the iron frame-work, (marked A,) similar to the head-block of a common lathe, is inserted a horizontal shaft of iron or steel, (marked B,) at the end of which is attached the cylindrical saw, (marked C.) The saw is oval and cylindrical in its shape, adapted on a true sweep to the sawing of all kinds of oval and cylindrical work, such as staves, fellies, &c. The saw is of wrought-iron with cast-steel teeth dovetailed in, or it may be made of any other metal, suitable and substantial, with cast-steel teeth inserted. Upon the shaft is a wooden whir or pulley, (marked E,) upon which is placed the band to propel the machine.

The operation of the machine is similar to that of the shingle-machine in the operation of the block, which is dogged and moved up by a carriage with set-work, except that in this machine the carriage moves upon a circular or oval sweep adapted to the form of the saw or of the work to be cut.

At the end of the table which passes into the saw or cylinder is attached a common spring against which the work passes. This spring drives back the work as soon as it is cut off.

The improvement claimed is—

In the form of the saw adapted to the sawing of oval or cylindrical work, as before stated, the references are made to the drawing which accompanies this specification, and there is also an accompanying model.

HART PEPPER.

Witnesses:
W. B. CALHOUN,
ZELOTUS LUMBARD.